United States Patent [19]
Schmidt

[11] 3,942,566
[45] *Mar. 9, 1976

[54] APPARATUS FOR SHAPING A WOODEN WORKPIECE ACCORDING TO A TEMPLATE CONFIGURATION

[75] Inventor: Erich Schmidt, Vienna, Austria

[73] Assignee: Maschinenfabrik Zuckermann Komm. Ges., Vienna, Austria

[*] Notice: The portion of the term of this patent subsequent to Feb. 11, 1992, has been disclaimed.

[22] Filed: Aug. 19, 1974

[21] Appl. No.: 498,370

Related U.S. Application Data

[62] Division of Ser. No. 342,803, March 19, 1973, Pat. No. 3,865,162.

[52] U.S. Cl. ................. 144/144 R; 83/413; 83/565; 90/13.2; 144/134 R
[51] Int. Cl.² ......................................... B27G 5/06
[58] Field of Search.................. 90/13.5, 13.2, 13.1; 83/565, 413; 144/134 R, 134 A, 136 R, 144 R, 144 A, 145 R, 145 A, 144 S, 2 R

[56] References Cited
UNITED STATES PATENTS
3,865,162   2/1975   Schmidt ......................... 144/144 R Primary Examiner—Donald R. Schran
Assistant Examiner—W. D. Bray
Attorney, Agent, or Firm—Karl F. Ross; Herbert Dubno

[57] ABSTRACT

An apparatus for shaping a wooden workpiece according to a template configuration has a carriage displaceable on a track parallel to a guide edge of a template clamped on a table to one side of the track. A workpiece is clamped to a table to the opposite side of the track. A slide is displaceable on the carriage transverse to the track and carries on one end a roller engaging the guide edge of the template and on its other end a driven tool for cutting the shape of the template into the workpiece. The slide is urged toward the workpiece so that virtually no lateral force is exerted against the workpiece, the guide edge acting as a stop positively determining the transverse position of the slide. Another template can support a second feeler roller which is connected via a chain or the like to the tool to raise and lower this tool according to the guide edge on the second template for two-sided cutting of the workpiece.

2 Claims, 2 Drawing Figures

APPARATUS FOR SHAPING A WOODEN WORKPIECE ACCORDING TO A TEMPLATE CONFIGURATION

This is a division of application Ser. No. 342,803 filed 19 March 1973, now Pat. No. 3,865,162.

FIELD OF THE INVENTION

The present invention relates to a copying apparatus. More particularly, this invention concerns a system for copying the shape of a template in a wooden workpiece.

BACKGROUND OF THE INVENTION

In the production of furniture and the like it is often necessary to produce in quantity identical unusually shaped parts. Legs for tables, headboards for beds, and the like are cut from workpiece blanks and must be identical in all respects.

The most common practice for such elements is to secure to them a template having the shape desired. A router arrangement having a smooth collar is used to cut this shape into the workpiece, the collar riding against the template while the cutting bit engages and shapes the workpiece. Clearly such a method requires a very secure attachment of the template to the workpiece and of the workpiece to a table or the like. Similarly each workpiece must have its own template. Such an arrangement is quite difficult when used with arrangements wherein a plurality of workpieces are mounted on respective carriages or dollies that move along a transport path past a plurality of work stations.

CROSS REFERENCE TO RELATED APPLICATION

In my copending application Ser. No. 274,518 filed 24 July 1972 for an APPARATUS FOR PERFORMING A SERIES OF OPERATIONS ON A SUCCESSION OF WOOD WORKPIECES there is described a system wherein a train of carriages is displaced stepwise along a working guide or tract along which are arranged a plurality of shaping machines such as borers, sanders, milling machines, and the like. A return guide coextensive with the working guide is arranged thereunder and at both the upstream and downstream ends there is provided an apparatus for removing a carriage from the one end of one guide and thereafter transferring it to the other guide. Each carriage is provided with clamping means for retaining a workpiece, and means is provided for laying a workpiece blank on the carriage at the upstream end of the working guide and for removing a shaped workpiece from the carriage at the downstream end of the working guide.

According to a feature of that invention each guide track is a pair of parallel round-section rods on which the carriages slide. The means at the ends for transferring carriages from one guide to the other are two pairs of such guide rods spaced apart at the same distance as in the guides and simultaneously registrable with the ends of both guides so that rotation about an axis parallel to the necessarily parallel guide rods can permit a workpiece which is slid off the working guide and onto the upper set of guide rods of the transferring means can be slid off onto the return guide after 180° rotation of the arrangement. This advantageously causes the empty carriage to be returned to the loading or upstream end of the working guide upside down so that any wood shavings or the like are automatically dumped off.

According to another feature of my earlier invention, means is provided along the working guide track to turn over the workpieces as they are stopped alongside it. This means has a pair of arms each provided with a pair of jaws and means for displacing it toward and away from the workpiece and for closing and opening the jaws as well as rotating them through 180°. In this manner the arms are advanced and the jaws are closed to grip the workpiece, then the arms are raised and the jaws are rotated through 180°. Thereafter the arms are lowered, the jaws opened, and the arms withdrawn.

The interval between cycles is determined by the longest individual working step, that amount of time needed for the slowest machine along the line to complete its particular operation, plus sufficient time to displace the carriages. In reality a nominal amount of time is spent displacing the workpieces in comparison to the amount of time spent actually working them. In addition, means is provided for immobilizing the entire train during the actual simultaneous shaping operations with each carriage held rigidly either sandwiched between two other cars or abutting one other car and a stop provided on the machine, which stop is only removed from the carriage's path during displacement of the carriages. This positive immobilization means that extremely accurate preparing of the workpieces is possible, since each workpiece is rigidly held on the bed of an immobilized carriage.

OBJECTS OF THE INVENTION

It is therefore an object of the present invention to provide an improved system for shaping or finishing a workpiece.

Another object is the provision of an apparatus which employs principles of my above-described earlier invention for the serial production of shaped wooden workpieces.

SUMMARY OF THE INVENTION

I attain these objects according to my invention in a system wherein the template is clamped to a table to one side of a track and the workpiece is clamped to a table to the other side of this track. A carriage is provided which can ride along the track, and a slide displaceable on the carriage transverse to the track is provided at one end with a roller engaging a guide edge of the template and at its other end with a roller engaging a guide edge of the template and at its other end with a driven material-removing tool for shaping the workpiece. The roller engages against the guide edge in one direction and means is provided between the carriage and the slide to urge the slide in this one direction so that the guide edge defines for the slide a stop which establishes the slide's position relating to the tracks. The tool is a shaping or milling head, a sanding drum, or the like and is rotated by a motor on the slide about a vertical axis coplanar with and parallel to the axis of free rotation of the feeler roller.

Such an arrangement applies virtually no force to the workpiece to displace it on its table. The router head, which may rotate at speed approaching 25,000 rpm, engages the side of the workpiece and removes material without displacing the workpiece at all. Similarly the workpieces can be replaced after shaping without the necessity of removing and otherwise handling the template. The slide is merely pushed back and a new workpiece is clamped in place.

According to another feature of this invention the workpiece table is a dolly or carriage displaceable on a track next to the guide track for the carriage carrying the slider. In this manner a succession of workpieces can be shaped according to a single template, thereby substantially reducing production costs.

In accordance with yet another feature of this invention the tool is vertically reciprocal and a second template having an upper guide edge is engaged by a second feeler roller. This second roller is urged down onto the second guide edge of this second template and is connected to the tool such that the tool is displaced vertically as the second roller raises and drops as it moves along its guide edge. In this manner the workpiece is given a shape on both its vertical and horizontal sides.

DESCRIPTION OF THE DRAWING

The above and other objects, features, and advantages will become apparent from the following with reference to the accompanying drawing in which.

SPECIFIC DESCRIPTION

Figure 1:
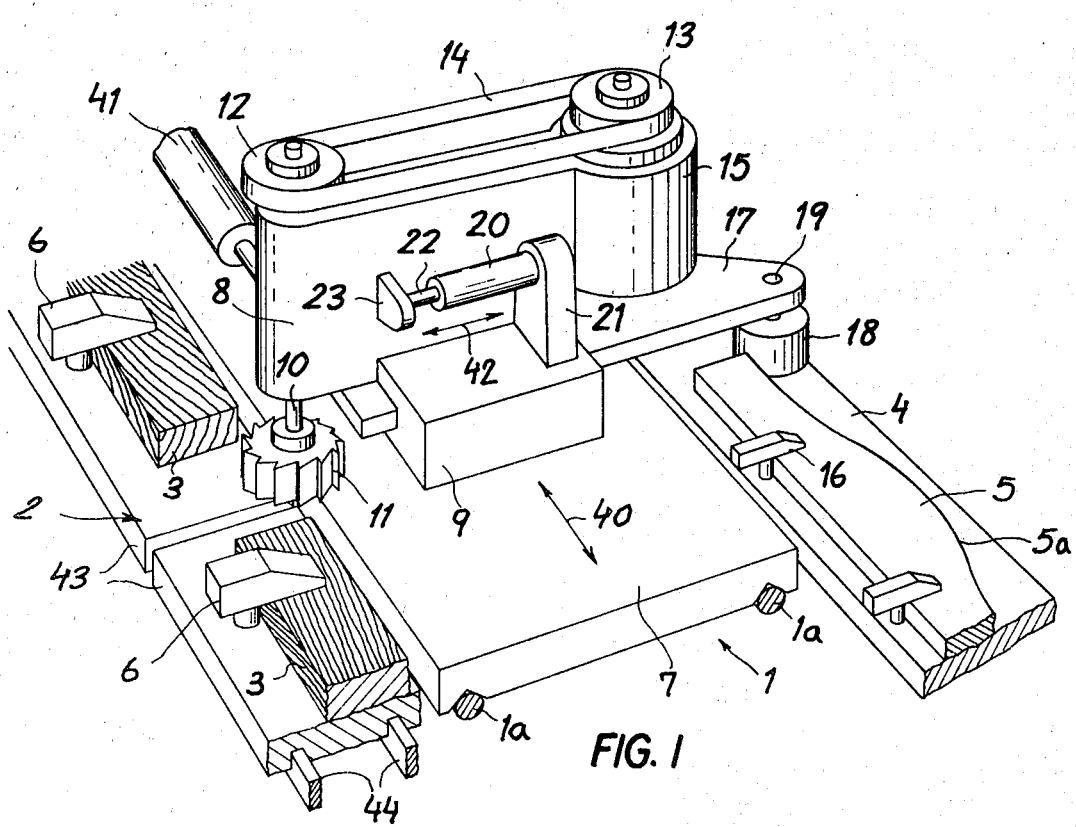
FIG. 1 is a perspective view of a first embodiment of the present invention.

The apparatus of FIG. 1 has a track 1 formed by two parallel round bars 1a on which rides a carriage 7 which is displaceable in the direction shown by arrow 40 by means of a cylinder 41. This carriage 7 is provided with a guide 9 in which a slide 8 is displaceable at a right angle to the direction 40 as shown by arrow 42.

To one side of the track there is provided a workpiece table 2 formed by a carriage 43 riding on a track 44 parallel to the track 1. A succession of such carriages or dollies 43 move along the track 44 as described in my above-identified copending patent application. Each such carriage 43 is provided with a pair of clamps 6 which are vertically reciprocal to clamp a wooden workpiece 3 to its upper surface.

To the other side of the track 1 there is provided a template table 4 onto which a template 5 is secured by a pair of pneumatic or spring clamps 16. The two tables 2 and 3 are across from each other to opposite sides of the track 1.

The slide 8 is biased in a direction toward the table 2 by a pneumatic cylinder 20 carried on an upright 21 extending from the guide 9 and having a piston rod 22 engaged against a lug 23 on the slide 8. A spring could take the place of cylinder 22. This cylinder is normally pressurized. In the side of the slide 8 toward the table 2 there is journaled a vertical shaft 10 on whose lower end is carried a milling tool 11 and on whose upper end is carried a pulley 12 connected to another pulley 13 by a V-belt 14. A motor 15 mounted on the slide 8 drives the pulley 13 at high speed, thereby rotating the tool 11.

The side of the slide 8 toward the table 4 is provided with an extension 17 on whose end is provided a vertical shaft 19 on which a roller 18 is freely rotatable. This feeler roller 18 can ride along a guide edge 5a on the template 5. This guide edge 5a therefore acts as a stop which determines the position of the slide 8 transverse to the guide 1.

In operation the motor 15 rotates the head 11 at high speed while the cylinder 41 slowly displaces the carriage 7 along its track 1 with the roller 18 following along the guide edge 5a. The shape of the edge 5a will be imparted to the edge of the workpiece 3. Since the tool 11 rotates at high speed there is virtually no pressure exerted on the workpiece 3 to displace it on its table 2. After the workpiece is shaped along its entire length the cylinders 20 and 41 are pressurized in the opposite direction to withdraw the tool 11 from the workpiece and return the carriage 7 to its starting position. At the same time the next carriage 43 is moved up next to the template table 4.

Figure 2:
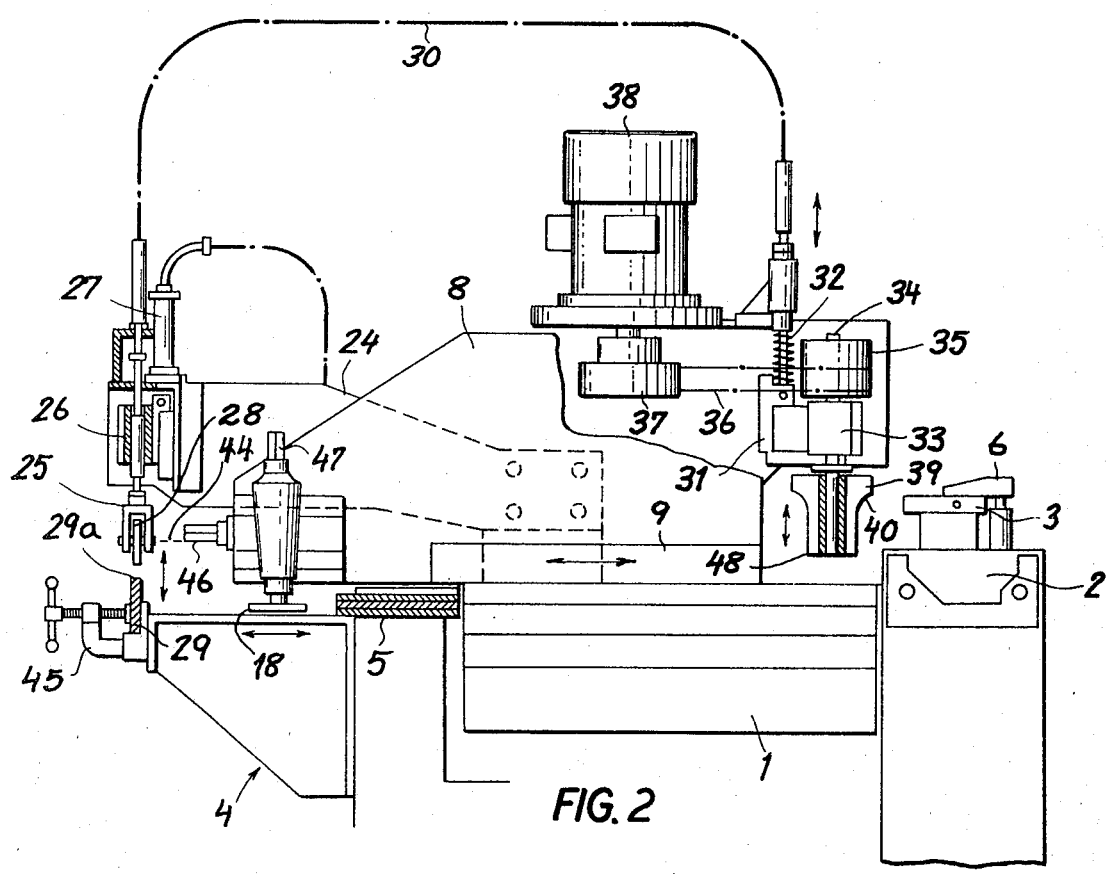
FIG. 2 is an end elevational view of a second embodiment of this invention.

The same reference numerals are used in FIG. 2 for functionally identical structure.

Here, however, the slide 8 is provided with an arm 24 in which a rod 26 is vertically displaceable. A fork 25 on the lower end of this rod 26 holds a second feeler roller 28 rotatable about a horizontal axis 44 transverse to the guide 1. Underneath this roller 28 a height template 29 having an upper guide edge 29a is secured by clamps 45 to the edge of the table 4. A pneumatic cylinder 27 urges the fork 25 down to hold the roller 28 in contact with the guide edge 29a.

The horizontally displaceable feeler roller 8 can be adjusted vertically and horizontally relative to the slide 8 by adjustment screws 46 and 47. The template 5 is made of plywood in this case.

The tool 39 is formed with a cylindrical lower region 48 and a flared-out upper region 40 and is mounted on a shaft 34 which is vertically displaceable in a sleeve 33 carried on the end 31 of the slide 8 turned toward the workpiece table 2. A vertically elongated pulley 35 on the shaft 34 is connected via a flat narrow belt 36 to a pulley 37 carried on a motor 38 mounted on the slide 8. Thus rotation of the motor 38 rotates the tool 39.

A nonextensible flexible element such as a bowden cable 30, ball chain, or the like is connected between the collar 33 and the rod 26. This collar 33 is vertically reciprocal on the end 31 so that as the roller 28 moves up, the tool 39 will move down, and vice versa. In this manner the shape of the upper edge 29a of the template 29 is reproduced in vertical reverse in the workpiece 3 by the portion 40 of the tool 39, whereas the horizontally contoured edge 5a is reproduced in the workpiece 3 by the portion 48 of milling tool 39.

In both arrangements the workpiece is completely independent of the template and can be secured easily to the table on which it is shaped. After shaping it is a simple job to unclamp the finished workpiece and put a new one in its place. In addition, and this is particularly important in roughing-in operations wherein large wood chips are produced, the separation of the template from the workpiece prevents chips from getting between the feeler roller and the guide edge and thereby giving a false reading to the shaping tool.

I claim:

1. An apparatus for reproducing the shape of a guide edge of a template in a wooden workpiece, said apparatus comprising:
   a support;
   a linearly extending track on said support;
   a carriage displaceable along said track;
   a template table on said support next to said track;
   means for securing said template to said template table with said guide edge facing in one direction transverse to said track;

a workpiece table on said support next to said track and adjacent said template table;

means for securing the wooden workpiece to said workpiece table;

a slide on said carriage displaceable transverse to said track;

a roller on said slide engageable in the opposite direction transverse to said track with said edge of said template, said roller being rotatable about a roller axis;

means on said carriage for urging said slide in said opposite direction for forcibly biasing said roller against said edge, said edge serving as a stop for said slide in said opposite direction;

a material-removing tool on said slide engageable with said workpiece, said tool being rotatable about an axis coplanar with said roller axis;

means on said carriage for rotating said tool on displacement of said carriage along said track for reproducing in said workpiece the shape of said edge whereby said tool exerts substantially no force upon the workpiece in said directions; and means for securing a second template to said template table, a second roller carried on said slide and engaging the guide edge of said second template, and means positively linking said second roller to said tool for vertically displacing said tool on displacement of said second roller by said second template.

2. The apparatus defined in claim 1 wherein said second template has a second guide edge extending substantially parallel to said track, said apparatus further comprising means for urging said second roller against said edge, said means positively linking said second roller to said tool being a nonextensible flexible element.

* * * * *